(12) United States Patent
Webb et al.

(10) Patent No.: US 11,704,120 B2
(45) Date of Patent: *Jul. 18, 2023

(54) OUT OF BAND LAYER SCRUBBING

(71) Applicant: Citrix Systems, Inc., Fort Lauderdale, FL (US)

(72) Inventors: John Webb, Sutton, MA (US); Christopher W. Midgley, Marlborough, MA (US); Robert Oakes, Somerville, MA (US); Bill Buckley, West Roxbury, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/650,254

(22) Filed: Feb. 8, 2022

(65) Prior Publication Data

US 2022/0156064 A1 May 19, 2022

Related U.S. Application Data

(63) Continuation of application No. 15/785,849, filed on Oct. 17, 2017, now Pat. No. 11,263,004.

(60) Provisional application No. 62/411,461, filed on Oct. 21, 2016.

(51) Int. Cl.
| | |
|---|---|
| *G06F 8/76* | (2018.01) |
| *G06F 8/61* | (2018.01) |
| *G06F 16/174* | (2019.01) |
| *G06F 16/188* | (2019.01) |

(52) U.S. Cl.
CPC .............. *G06F 8/76* (2013.01); *G06F 8/61* (2013.01); *G06F 16/174* (2019.01); *G06F 16/188* (2019.01)

(58) Field of Classification Search
CPC ....................................................... G06F 8/76
See application file for complete search history.

(56) References Cited

U.S. PATENT DOCUMENTS

| | | | |
|---|---|---|---|
| 7,970,789 B1 * | 6/2011 | Blaser | G06F 9/455 717/170 |
| 8,386,757 B1 | 2/2013 | Midgley et al. | |
| 8,543,797 B1 | 9/2013 | Midgley et al. | |
| 9,201,494 B1 | 12/2015 | Midgley et al. | |
| 2013/0219286 A1 * | 8/2013 | Ben-Shaul | G06F 9/45533 715/745 |

\* cited by examiner

*Primary Examiner* — Van H Oberly (57) ABSTRACT

A computer processing system includes a processor to operate in a first computing environment. The processor creates a generic application layer by scrubbing a new application layer within the computer processing system to remove objects associated with the new application layer and specific to the first computing environment. The processor further creates within the computer processing system a single composited layered image by merging the generic application layer with at least one other application layer having objects associated therewith.

18 Claims, 4 Drawing Sheets

OUT OF BAND LAYER SCRUBBING

RELATED APPLICATIONS

This application is a continuation of U.S. application Ser. No. 15/785,849 filed Oct. 17, 2017, which claims the benefit of provisional application Ser. No. 62/411,461 filed Oct. 21, 2016, which are hereby incorporated herein in their entirety by reference.

TECHNICAL FIELD

The present disclosure relates to the field of computing devices, and more particularly, to delivering software applications to computing devices.

BACKGROUND

Many companies need to deliver software applications to their employees that may be working in a variety of different environments. The different environments include different physical machines, different virtual machines, and different geographic locations, for example. The applications need to work in the end environment to be useful, but initial configuration of the applications at an install time may set them up for only one user or one environment.

Application layering is a technology that separates computer applications from an operating system image, and allows the applications to be added and removed from the operating system by merging the file systems instantly, without application installation or removal on the operating system image. This allows centralized storage and IT management of applications, creating increasing benefits with scale of company users.

Microsoft's App-v provided some hooks to run operations when delivering applications to environments. This framework only worked in-guest to the machine being delivered the application, and thus could not perform any arbitrary operation.

Attempts have been made to address this problem, but only for getting specific applications and application features to work together when merged with other applications and application updates. These features were implemented in a manner that are very specific and closed to complex run-time decisions. These features are detailed in U.S. Pat. Nos. 8,386,757, 8,543,797, and 9,201,494, which are hereby fully incorporated by reference in their entirety and are assigned to the current assignee of the present disclosure.

Citrix's PVS application is a solution that streams OS images to machines. PVS has the ability to change a few set values in the Window's operation system when streaming the image over. This has limited information to work on, can only work on a few select values, and has limited inputs for when to modify streaming data.

Application layering solutions work well when computing environments are identical. The computing environment includes the specific version of an operating system, hypervisor, broker, provisioning system, supporting drivers, and software for connected hardware and applications including settings and configurations for all of these things. When an application layer is deployed into an environment matching the environment in which the layer was created, operation is usually flawless.

Some environment changes between creation and destination may have no impact on an application layer, while others may prevent or create unexpected application behavior. Different operating systems may require different file formats, different versions within the same operating system may alter expected file paths, registry locations, or included/standard libraries.

Hypervisors generally have specific drivers and services injected into the guest OS that modify the workings of the system and rely on hardware being presented to the guest OS that is only there in that hypervisor environment. Without the hypervisor-specific drivers, an OS may not boot, thus preventing desktop operation.

Different installed application software may alter or delete files or keys expected by another application. Existing solutions include creation of different application layers for the same application with deployment into different environments. So one software application may be installed into multiple application layers, with each layer specific to different environments. The different embodiments include changing operating system or operating system version, changing hypervisor or hypervisor version, as well as separate layers for the application by itself or in combination with other applications which might impact each other if layered separately.

The number of application layers needed to maintain for a single application can also multiply with different sources of environment changes. For example, if two applications impact each other, three layers may be needed (one for each application operated without the other installed, and one for both applications operated with both installed). If either application requires changes between operating system versions, all three layers may be needed for each different operating system version (or six layers needed, if two different operating systems versions). These six layers may again multiply if different layers are also needed per hypervisor. This creates an IT management problem for maintaining and updating multiple layers for the same application.

None of the above provides an application layering solution with the ability to create applications that have had environmental configurations removed to enable their correct execution in different environments, and do not provide the ability to remove and merge data after the installation of the application for delivery to environments that are not known or accessible at install time. What is needed, therefore, is a solution that overcomes the above-mentioned limitations and that includes the features enumerated above.

SUMMARY

A computer processing system includes a processor to operate in a first computing environment. The processor creates a generic application layer by scrubbing a new application layer within the computer processing system to remove objects associated with the new application layer and specific to the first computing environment. The processor further creates within the computer processing system a single composited layered image by merging the generic application layer with at least one other application layer having objects associated therewith.

The objects may comprise file system objects and registry objects.

The single composited layered image may be delivered to an end point computer processing system operating in the first computing environment, and wherein the processor may be further configured to scrub the single composited layered image by modifying the single composited layered image to include objects that are specific to the first computing environment.

The single composited layered image may be delivered to an end point computer processing system operating in a second computing environment that is different from the first computing environment, and wherein the processor may be further configured to scrub the single composited layered image by modifying the single composited layered image to include objects that are specific to the second computing environment.

The processor may be further configured to associate a recipe with the new application layer, with the recipe specifying scrubbing functions to be performed to create the generic application layer.

The recipe may specify the scrubbing functions to be performed at specific event points in a life cycle of the generic application layer, and wherein the specific event points include when the single composited layered image is created.

The scrubbing functions specified by the recipe may include functions to add, delete, remove or merge the objects associated with the generic application layer and the single composited layered image.

The generic application layer and the at least one other application layer may have specific layer information associated therewith, and wherein a portion of the scrubbing functions specified by the recipe are conditional on the specific layer information.

The single composited layered image may be delivered to a target environment, and wherein a portion of the scrubbing functions specified by the recipe are conditional on the target environment.

The processor may be further configured to detect when one of the specific event points has been reached by the generic application layer, and run the recipe based on detecting that one of the specific event points has been reached.

Another aspect is directed to a method the includes creating a generic application layer by scrubbing a new application layer, within a computer processing system operating within a first computing environment, to remove objects associated with the new application layer and specific to the first computing environment. The method further includes creating within the computer processing system a single composited layered image by merging the generic application layer with at least one other application layer having objects associated therewith.

Yet another aspect is directed to a non-transitory computer readable medium for a computer processing system operating in a first computing environment, with the non-transitory computer readable medium having a plurality of computer executable instructions for causing a processor within the computing device to perform the steps as described above.

BRIEF DESCRIPTION OF THE DRAWINGS

The present invention will be understood more fully from the detailed description given below and from the accompanying drawings of various embodiments of the disclosure which, however, should not be taken to limit the invention to the specific embodiments, but are for explanation and understanding only.

DETAILED DESCRIPTION

The present disclosure will now be described more fully hereinafter with reference to the accompanying drawings, in which preferred embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The terminology and definitions of the prior art are not necessarily consistent with the terminology and definitions of the current disclosure. Where there is a conflict, the following definitions apply.

Application layer means a container with all of the file system and registry objects that make up that application. An application layer can contain multiple applications.

Computing environment includes the specific version of an operating system, hypervisor, broker, provisioning system, supporting drivers, and software for connected hardware and applications, and all related settings and configurations.

Compositing means the act of compiling or merging multiple layers into a single layered image.

Layered image or a single composited layered image means a single disk that has been composited with multiple application layers. A layered image contains the minimum amount of information needed for an operating system to boot, and while it may contain many other applications delivered via composited layers, it is also possible for additional layers to be attached at a time once the OS layer is booting or booted.

Out of band means capable of being run outside of the guest operating system that a layer will be delivered to.

OS layer means a layer containing the base OS in a minimum state to be complete.

Packaging disk means a bootable layered image that will record any registry and file system changes to create a new layer or revision of a layer of any type.

Platform layer means a specialized version of an application layer that contains content which enables an operating system to function correctly in a specific hardware (physical or virtual) environment.

Scrubbing means the modification of any file system objects or registry objects to remove, add, or change data to ensure the end product will run in a desirable manner.

Application layering is an established technology that separates computer applications from an operating system image, and allows applications to be added and removed from the operating system by compositing the file systems instantly, without application installation or removal on the operating system image. It works by capturing file system and registry modifications for a set of applications and capturing them into a filesystem. A common way of doing that is to present a virtualized view of the file system and registry of the operating system, and record changes live into a writeable file system separate from a base booting operating system.

Those captured layers can later be composited with other application layers to either create or enhance bootable file system images. Compositing merges the file system and registry objects from the various layers, so that if a directory had "foo.txt" captured in the first layer and "bar.txt" captured in the directory of the second layer, the resultant composition of the two would have 2 files, "foo.txt" and "bar.txt." These composition operations can take place outside of the resultant image (offline) or on a live system by injecting them real time into a virtualized file system and registry and continuing the existing virtualization of the file system and registry with those new file systems going forward.

Out of band scrubbing is a solution which modifies layers outside of a system running the layer. A layer manager (ELM) may track life cycle events for a layer, and environment and job specific details when a layer is delivered for operation, and apply recipes to modify the layer. This enables generalizing a layer after creation, specific modifications for delivery into a specific environment, and further customization at scriptable event points.

A recipe, or specification of the modifications, entails a file or set of files that specify, in a machine readable format, functions to perform at specific event points in the life cycle of an application layer. The recipes are run by the ELM or a separate computer system network connected with the ELM, and preferably are Javascript but may be implemented in any executable, scripting, programming, or metadata language. Life cycle points for an application layer include finalization of a layer (creation), delivery into a layered image, first delivery to a specific machine, first access by a user on a specific login, removal of access to a layer for a user, and removal of a layer from a machine. The life cycle points are based on events detectable by the ELM. Each application layer may have one or more recipes, which may be run at every life cycle point to trigger any specific recipe functions for that specific life cycle point.

Recipes can also reference other recipes to allow universal application, such as triggering a specific recipe to always apply at layer finalization for every newly created layer, or triggering a specific recipe to insert hypervisor specific drivers and configurations for every layer delivered to that specific hypervisor.

The recipe functions contain programmatic code to perform computations to add, remove, delete, and merge file system objects and registry objects. One example may be a function (PathMerge) to merge the Windows registry value representing the shell path. That function may be specified in a recipe that triggers this PathMerge function upon a PackageDiskCreate event which occurs when multiple layers are merged together to create a new packaging disk. Such a PathMerge function may include code to iterate through each application layer being merged, read any shell path value for each layer, append any new shell path value into an in-memory copy of a merged shell path value with correct delimiter values, and write out that merged shell path value to the resultant merged image shell path variable value.

In addition to being triggered for specific life cycle events, recipes may also be conditional on other environmental factors and job criteria. Such criteria may include several default variables including per-layer information (OS type, creation date, creation software version, relative priority with regards to other include layers, and layer type), execution variables for the target environment (physical or virtual, hypervisor or cloud type, provisioning system, broker system, and configuration software used to move the disk to the target environment), and job specific information (such as the version of the software compiling the image).

This additionally conditional behavior allows for recipes that ensure specific environmental content is present or removed. For example, a recipe may be designed to disable any service related to a specific hypervisor whenever the target environment is not that hypervisor. This recipe may trigger on a layer delivery event conditionally where the destination hypervisor is not the specific hypervisor. The recipe function, when triggered, may scan each layer for specific registry keys which enable or disable services related to the specific hypervisor, and set those keys to disabled. Similarly, an opposite recipe may be designed to enable specific hypervisor services, and trigger conditionally when the destination hypervisor is the specific hypervisor.

The recipe code may also scan for existence of data on one or more included layers to determine whether or not a further function should do work. For example, a recipe may be triggered (such as at a PackageDiskCreate event) and check for the existence of any Windows' drivers in every layer being merged. If drivers are found in multiple layers, then the recipe function may merge the Windows Driver Store files to ensure all drivers from all layer sources are registered with the underlying OS correctly for proper functioning when the layered image boots.

The same recipe matching may also be defined by and for specific individual users. This creates recipes which match on requisite criteria when being formed for that user. For example, a user could create or configure a recipe that specifies every time, or at a specific event, a specific layer is included in a layered image, that recipe should be run. This can be useful for user-specific authentication or authorization, such as application keys which are specific to a user/software.

One such example is for a user recipe to fix .NET Fusion keys to their application layer containing Microsoft Office products and a number of compositing events. The recipe may specify that, when creating a packaging disk for that user, if a specific Microsoft Office layer was included then the recipe function merges various registry keys needed for .NET to work correctly. In this fashion, the user can ensure appropriate software keys are always present.

While out-of-band scrubbing can be applied and have benefit at many life cycle events, two are of particular importance. When scrubbing is performed at finalization of a new application layer, information about the creation environment can be captured for later use in conditional evaluations. When scrubbing is performed at delivery into a layered image, specifics about the creation environment that are not present in the destination environment can be scrubbed out, and specifics about the destination environment scrubbed in.

Figure 1:
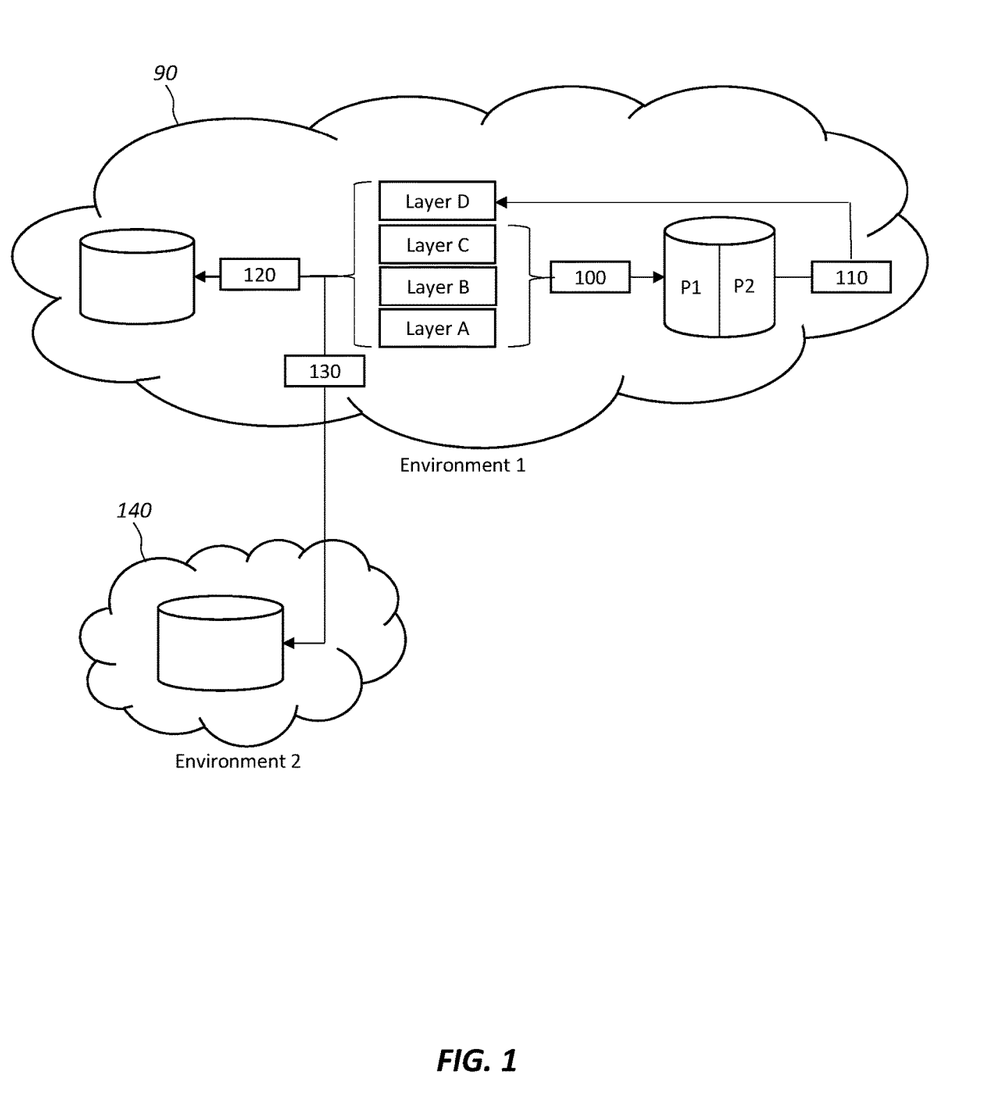
FIG. 1 is an example of the flow out of band scrubbing can follow in a computing environment in accordance with the present disclosure.
Figure 2:
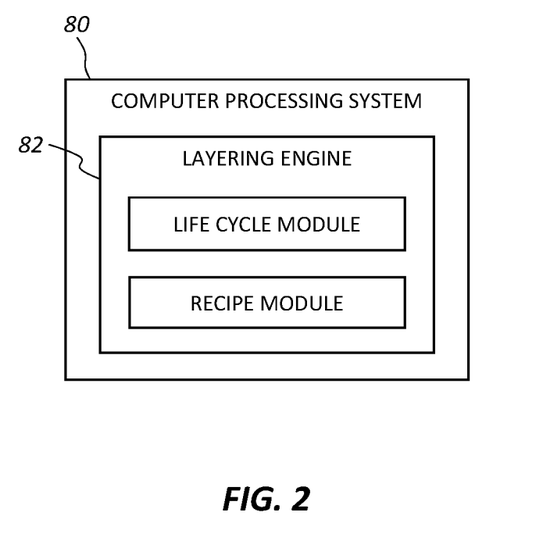
FIG. 2 is a block diagram of a computer processing system with a layering engine configured to operate in the computing environment illustrated in FIG. 1.

Referring to FIGS. 1 and 2, a computer processing system 80 is operating within a first computing environment 90. The computer processing system 80 includes an application layering system or a layering engine 82. The layering engine 82 includes a life cycle module 84 and a recipe module 86.

The layering engine 82 is already operational with operating system layers and application layers A, B, and C. A new application layer D can be created by compiling a number of previously created layers into the first partition P1 of a two partition packaging disk. The first partition P1 represents a completely bootable operating system, the result of the merging of all file system and registry objects from already existing application layers A, B and C. The second partition P2 can be left empty to create a completely new application layer D. Alternatively, the second partition P2 can be delivered a copy of an existing application layer if a new revision of that application is desired.

When booted within a hypervisor on a computer, any changes made are recorded into the second partition P2 using a file system virtualization technique such as described in U.S. Pat. Nos. 8,386,757, 8,543,797, and 9,201,494. Any new application installed, or new version applied, is recorded in the second partition P2.

Once changes are complete, the second partition P2 is an origination copy of a new application layer D for the new application or new application revision.

When merging 100 existing layers A, B and C to composite the bootable system, out of band scrubbing can be performed. In this case, scrubbing is the modification of any file system or registry contents to remove, add, or change data in a layer to insert specifics for a destination environment (newly created layers will similarly be scrubbed to remove such environment specifics). This scrubbing is out of band as the computer performing the modifications is not done by the same machine (virtual or physical) operating the image being modified. The layering engine 82 operates logic for managing and delivering layers. When the new layer is finalized, the layering engine 82 may scrub 110 that layer so that it is a generic application layer before making it available to other users. The scrubbing modifications are made based on recipes.

Once the recording of the new application layer D is finished, the disk is ready to be converted 110 into an independent layer, separate from the original volume so that it may be added to a catalog of applications and made available to other machines. At this point the layering engine 82 may perform out of band scrubbing on the layer on the new application layer D to remove the file system objects and registry objects specific to the first computing environment 90 so as to create the generic application layer.

A recipe triggering on a LayerFinalize event may embed information about creation of the layer, for example, such as creation environment and software versions used to capture the layer. Such embedded information may be stored as metadata about the layer, an XML or JSON file inserted into the layer, or stored directly in the layer such as in the registry, filesystem, or boot blocks. Enforcing a consistent location for such embedded information allows later use by recipes, such as in conditional computations to determine if specific functions should trigger at reached events.

The generic application layer D is then stored for future deployment. When deployed, the generic application layer D is merged, in conjunction with other previously created application layers A, B and C, into a single composited layered image or disk, as in traditional application layering. The creation of that merged disk pulls together the file system and registry objects from all of the various layers to create a single disk representing a copy of all the various contents. Scrubbing may also take place during that merge to ensure that any issues that can potentially arise from cross layer dependencies may be resolved.

Before the single composited layered image is delivered to a specific environment, the layering engine 82 can execute scrubbing recipes 120, 130 to modify the files and registries on that disk. The scrubbing can modify the disk for running in the same environment or enact modifications, again from a recipe, contents of another layer, or a generic API to modify the contents of the disk in such a way to enable it to run in a different destination environment, for example with specific hardware present on a different target platform. That specific hardware could include specific drivers for disks, network, or any other environment specific attribute that the software in the disk needs to be configured for.

The scrubbing performed at recipe 120 is for the single composited layered image to be delivered to an end point computer processing system operating in the first computing environment 90. The layering engine 82 scrubs 120 the single composited layered image by modifying the file system objects and registry objects to include file system objects and registry objects that are specific to the first computing environment 90.

The scrubbing performed at recipe 130 is for the single composited layered image to be delivered to an end point computer processing system operating in a second computing environment 140 that is different from the first computing environment 90. The layering engine 82 scrubs 130 the single composited layered image by modifying the file system objects and registry objects to include file system objects and registry objects that are specific to the second computing environment 140.

Figure 3:
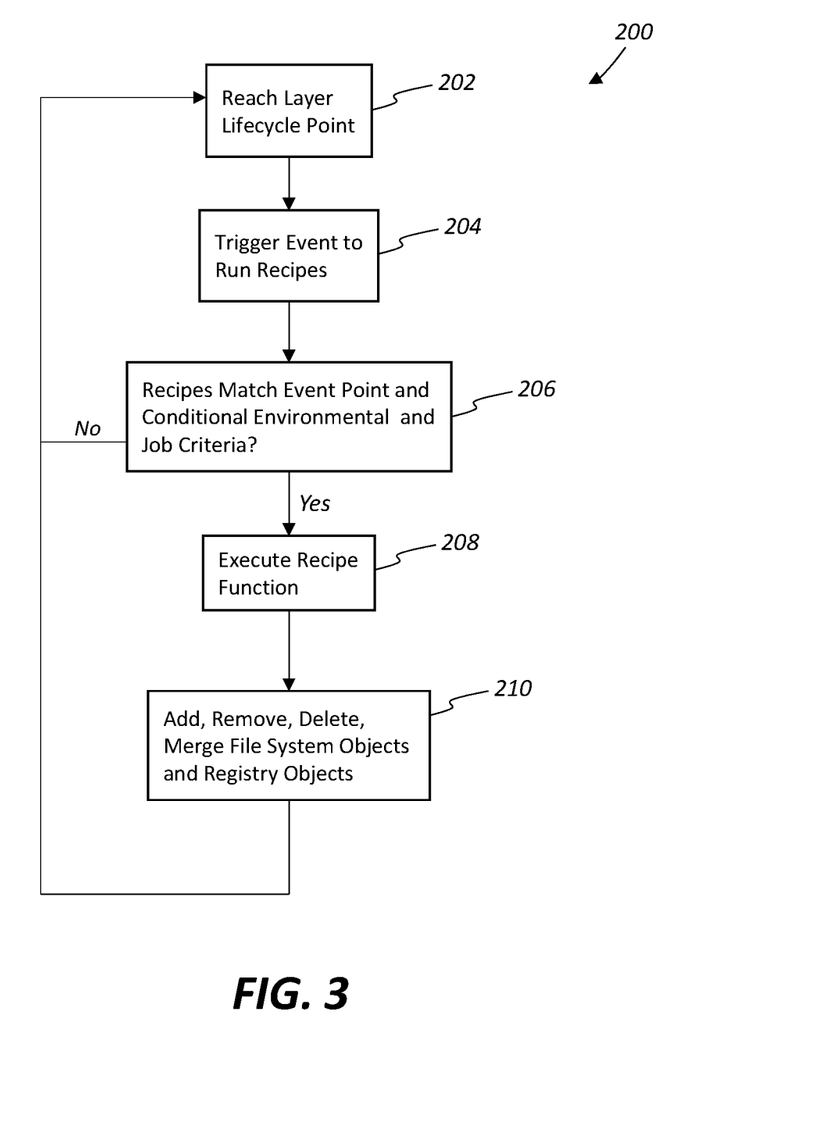
FIG. 3 is a flowchart of the scrubbing process in accordance with the present disclosure.

Referring now to FIG. 3, a flowchart 200 of the scrubbing process will be described. As noted above, the layering engine 82 is configured to associate a recipe with the new application layer D, with the recipe specifying scrubbing functions to be performed at specific event points in a life cycle of the generic application layer. The specific event points include when the new application layer is created (corresponding to 110) and when the single composited layered image is created (corresponding to 120, 130).

At Block 202 in FIG. 3, this represents that a specific event point in the life cycle of the generic application layer D has been reached. At Block 204, this represents that the specific event point can trigger a recipe to be run. If a recipe is available for the specific end point, then a determination is made at Block 206 if the recipe matches the specific event point.

The recipe may be conditional to specific layer information associated with anyone of the application layers in the single composited layered image, or conditional to the target environment for the single composited layered image. If the determination in Block 206 is NO, then the process returns to Block 202 for when other specific event points are reached. If the determination in Block 206 is YES, then the process continues to Block 208 to execute the recipe. With execution of the recipe, the scrubbing functions specified by the recipe include functions at Block 210 to add, delete, remove or merge the file system objects or registry objects associated with the generic application layer and the single composited layered image. At this point, the process then returns to Block 202 for when other specific event points are reached.

Figure 4:
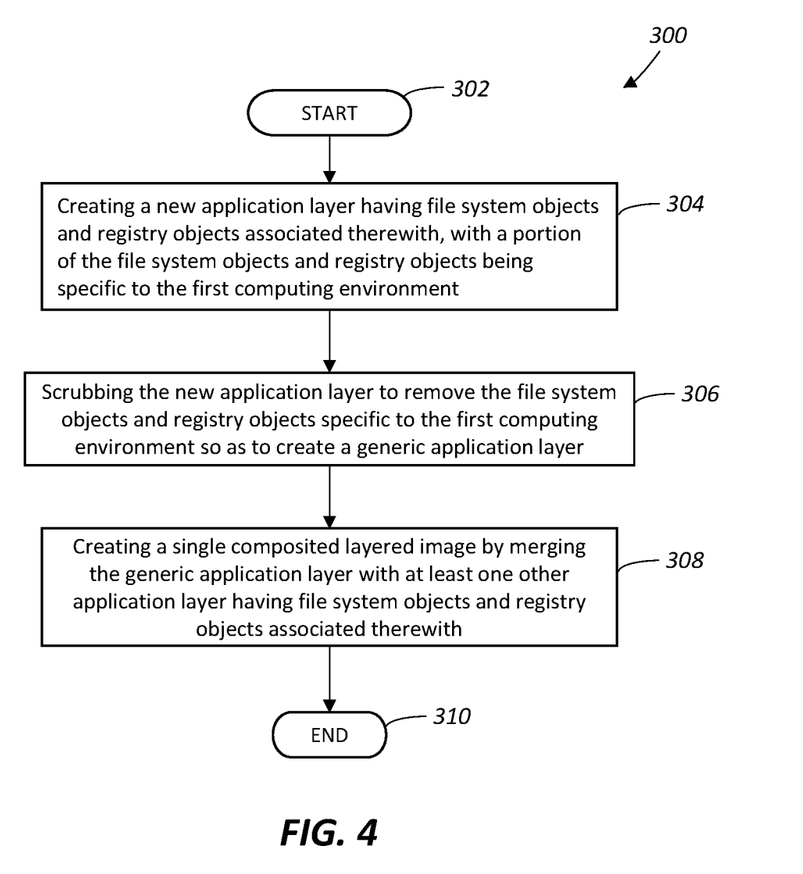
FIG. 4 is a flowchart of a method for operating the layering engine in the computer processing system illustrated in FIG. 2.

Referring now to FIG. 4, a flowchart 300 of a method for operating the layering engine 82 in the computer processing system 80 will be described. From the start (Block 302), the method includes creating a new application layer D having file system objects and registry objects associated therewith, with a portion of the file system objects and registry objects being specific to the first computing environment 90. The method further includes scrubbing the new application layer D at Block 304 to remove the file system objects and registry objects specific to the first computing environment D so as to create a generic application layer. A single composited layered image is created at Block 308 by merging the generic application layer with at least one other application layer having file system objects and registry objects associated therewith. The method ends at Block 310.

Another aspect of the present disclosure is directed to a non-transitory computer readable medium for a computing device operating in a first computing environment 90, with the non-transitory computer readable medium having a plurality of computer executable instructions for causing a layering engine 82 within the computing device 80 to perform the steps as described above.

Multiple variations and alternate embodiments of out of band scrubbing are possible. These may be implemented separately, or in various combination.

In addition to scrubbing layers out-of-band, and delivering whole images to machines, another embodiment includes providing these layers and then performing additional scrubbing in-line in the guest machine that is operating on a compiled image. Those applications can be delivered "on-demand" to the users' machine by mounting the layer images and immediately virtualizing them into the machine's operating file system. Additional information can be accessed by recipes at this point, such as the user's identity, to assist in conditional evaluations for which scrubbing functions run. Recipes and other forms of instructions can then be used to guide a live scrubbing process which makes adjustments as needed to the file system, both by adding, updating, and removing objects in the file system(s) as well as by modifying how the virtualization of the file system presents the data to the operating system. This may extend recipe functionality to perform services such as stopping, starting, or relaunching live services or applications, cleaning up files, and upgrading schemas beyond out-of-band capabilities.

In another embodiment, the out of band scrubbing may take place on the same machine operating a layered disk without being an in-line operation to the end guest environment. For example, a machine may be booted to a different OS image to perform scrubbing out-of-band scrubbing on the same machine that is separately booted to the operating end guest environment.

In another embodiment, out of band scrubbing may apply to other software containers. Standard software application packages, or software containers such as Windows containers, may be modified based on recipes before deployment in a similar fashion as modification of application layers.

Another alternate embodiment applies out of band scrubbing recipes to solve other application problems that arise in complex computing environments. For example, out of band scrubbing recipes may be written so that desktops or servers are repaired back to a known good state by removing a minimal number of changes done in the end environment, ensuring that the applications again function correctly.

Similarly, out of band scrubbing may allow computing environments that are partially persistent. In such a situation, scrubbing rules may remove some areas that are modified while leaving others unchanged, to allow things such as network information to remain cached (persistent) while removing sensitive user information in shared resources.

In another alternate embodiment, scrubbing recipes are provided other images and layers as input. This allows the recipe to apply conditionals based on these other images and layers to determine which functions are run.

In another alternate embodiment, recipes may be run across more than one compiled image. In environments that need multiple images, scrubbing functions may run across multiple images.

In another alternate embodiment, an application programming interface (API) may be used to trigger scrubbing recipes. This allows external events, for example an infrastructure updating event or alteration of an Active Directory group, to trigger recipes apart from layer life cycle events.

In another alternate embodiment, out of band scrubbing may be triggered based on events from the operating destination environment in addition to application life cycle events. For example, such events may include starting or stopping a process, service, or driver, or a forced logout.

In another alternate embodiment, the out of band scrubbing recipes can leave information in the layered image for in-guest software that will utilize the contents to make decisions upon. As the recipes can insert data into registries or file system, this provides a way to pass information from scrubbing to the guest environment that the scrubbed image will execute within.

In another alternate embodiment, application-specific customizations may be injected into the applications contained in a layer. For example, specific security settings for an application may vary depending on the destination environment, or the user or user group operating the system into which an application layer is being merged.

In another alternate embodiment, policies can be managed by a system or policy administrator, and tracked by the ELM or a connected policy database computer system. Recipes may access policies as additional conditionals when determining whether or not to run a function. This may be used to enable application-specific customizations.

In another alternate embodiment, out of band scrubbing may remove entire applications before delivery of application layers or images to another end point. In this case, images or layers with multiple applications contained within them may have recipes specifying how and when to remove subsets of those applications.

It is to be understood that the above description is intended to be illustrative, and not restrictive. Many other embodiments will be apparent to those of skill in the art upon reviewing the above description. The scope should, therefore, be determined with reference to the appended claims, along with the full scope of equivalents to which such claims are entitled.

The invention claimed is:

1. A computer processing system comprising:
a processor to operate in a first computing environment and configured to perform the following:
create a generic application layer by scrubbing a new application layer within the computer processing system to remove objects associated with the new application layer and specific to the first computing environment, and
create within the computer processing system a single composited layered image by merging the generic application layer with at least one other application layer having objects associated therewith;
wherein said processor is further configured to associate a recipe with the new application layer, with the recipe specifying scrubbing functions to be performed to create the generic application layer.

2. The computer processing system according to claim 1 wherein the objects comprise file system objects and registry objects.

3. The computer processing system according to claim 1 wherein the single composited layered image is to be delivered to an end point computer processing system operating in the first computing environment, and wherein said processor is further configured to scrub the single composited layered image by modifying the single composited layered image to include objects that are specific to the first computing environment.

4. The computer processing system according to claim 1 wherein the single composited layered image is to be delivered to an end point computer processing system operating in a second computing environment that is different from the first computing environment, and wherein said processor is further configured to scrub the single composited layered image by modifying the single composited layered image to include objects that are specific to the second computing environment.

5. The computer processing system according to claim 1 wherein the recipe specifies the scrubbing functions to be performed at specific event points in a life cycle of the generic application layer, and wherein the specific event points include when the single composited layered image is created.

6. The computer processing system according to claim 1 wherein the scrubbing functions specified by the recipe include functions to add, delete, remove or merge the objects associated with the generic application layer and the single composited layered image.

7. The computer processing system according to claim 1 wherein the generic application layer and the at least one other application layer have specific layer information associated therewith, and wherein a portion of the scrubbing functions specified by the recipe are conditional on the specific layer information.

8. The computer processing system according to claim 1 wherein the single composited layered image is to be delivered to a target environment, and wherein a portion of the scrubbing functions specified by the recipe are conditional on the target environment.

9. The computer processing system according to claim 5 wherein said processor is further configured to perform the following:
   detect when one of the specific event points has been reached by the generic application layer; and
   run the recipe based on detecting that one of the specific event points has been reached.

10. A method comprising:
   creating a generic application layer by scrubbing a new application layer, within a computer processing system operating within a first computing environment, to remove objects associated with the new application layer and specific to the first computing environment;
   creating within the computer processing system a single composited layered image by merging the generic application layer with at least one other application layer having objects associated therewith; and
   associating a recipe with the new application layer, with the recipe specifying scrubbing functions to be performed to create the generic application layer.

11. The method according to claim 10 wherein the objects comprise file system objects and registry objects.

12. The method according to claim 10 wherein the single composited layered image is to be delivered to an end point computer processing system operating in the first computing environment, and further comprising scrubbing the single composited layered image by modifying the single composited layered image to include objects that are specific to the first computing environment.

13. The method according to claim 10 wherein the single composited layered image is to be delivered to an end point computer processing system operating in a second computing environment that is different from the first computing environment, and further comprising scrubbing the single composited layered image by modifying the single composited layered image to include objects that are specific to the second computing environment.

14. The method according to claim 10 wherein the recipe specifies the scrubbing functions to be performed at specific event points in a life cycle of the generic application layer, and wherein the specific event points include when the single composited layered image is created.

15. The method according to claim 10 wherein the scrubbing functions specified by the recipe include functions to add, delete, remove or merge the objects associated with the generic application layer and the single composited layered image.

16. The method according to claim 10 wherein the generic application layer and the at least one other application layer have specific layer information associated therewith, and wherein a portion of the scrubbing functions specified by the recipe are conditional on the specific layer information.

17. The method according to claim 10 wherein the single composited layered image is to be delivered to a target environment, and wherein a portion of the scrubbing functions specified by the recipe are conditional on the target environment.

18. A non-transitory computer readable medium for a computer processing system operating in a first computing environment, with the non-transitory computer readable medium having a plurality of computer executable instructions for causing a processor within the computing device to perform steps comprising:
   creating a generic application layer by scrubbing a new application layer, within a computer processing system operating within a first computing environment, to remove objects associated with the new application layer and specific to the first computing environment;
   creating within the computer processing system a single composited layered image by merging the generic application layer with at least one other application layer having objects associated therewith; and
   associating a recipe with the new application layer, with the recipe specifying scrubbing functions to be performed to create the generic application layer.

* * * * *